United States Patent [19]

Hirose

[11] Patent Number: 4,579,746
[45] Date of Patent: Apr. 1, 1986

[54] METHOD OF PREPARING A COOKED AND FROZEN NOODLE PRODUCT

[75] Inventor: Akio Hirose, Tokyo, Japan

[73] Assignee: Nisshin Flour Milling Co., Ltd., Japan

[21] Appl. No.: 683,929

[22] Filed: Dec. 20, 1984

[30] Foreign Application Priority Data

Dec. 26, 1983 [JP] Japan ................................ 58-244251

[51] Int. Cl.$^4$ .......................... A23L 1/16; A23L 3/36
[52] U.S. Cl. .................................. 426/524; 426/506; 426/557
[58] Field of Search ............... 426/293, 296, 302, 506, 426/451, 557, 524

[56] References Cited

U.S. PATENT DOCUMENTS 3,318,707  5/1967  Ernst ................................. 426/557

FOREIGN PATENT DOCUMENTS 58-116643  7/1983  Japan ................................. 426/557

*Primary Examiner*—George Yeung
*Attorney, Agent, or Firm*—Larson and Taylor

[57] ABSTRACT

A new method of preparing a cooked and frozen noodle product capable of being re-cooked to the "ready-to-eat" state uniformly in its texture with recovering the original, good chewiness of the non-frozen, cooked noodle product, is now provided, which method comprises applying water onto the outer, exposing surfaces of the noodles cooked and frozen in a clump form, followed by freezing the applied water on the noodle surfaces.

4 Claims, No Drawings

METHOD OF PREPARING A COOKED AND FROZEN NOODLE PRODUCT

This invention relates to a method of preparing a cooked and frozen noodle product. More particularly, this invention relates to a method of preparing a cooked and frozen noodle product which is suitable for being re-cooked and restored to the original state of the cooked noodle product by heating in an electronic or microwave oven and is thus capable of being re-cooked to the state of ready-to-eat uniformly in its texture with recovering the good chewiness of the original cooked noodle product, for example, cooked preparations of pastas, inclusive of macaroni, spaghetti and vermicelli, as well as Japanese style noodles and Chinese style noodles.

Hithertobefore, various proposals have been made for providing improved methods of preparing a cooked and frozen noodle product, such as cooked and frozen products of various grades of macaroni, spaghetti and vermicelli. However, it is known that when such cooked and frozen noodle products which have been prepared and frozen according to the prior art methods are re-cooked and restored to the original, cooked and hot state by being heated in a microwave oven (this oven may sometime be termed as electronic oven), the so re-cooked and heated noodle products are likely to be restored with being non-uniform in their texture, affecting adversely the chewiness of the re-cooked noodle products, and this drawback is involved in any known methods of preparing the cooked and frozen noodle products. This drawback is considered to be mainly due to that water is evaporated off out of the outer, exposing surfaces of the noodle strings or pieces as associated together in a clump or mass form in the course of the noodle product being frozen and stored in the frozen clump form, so that such parts of the frozen noodle products from which water has been evaporated off can have been dehydrated much more and became harder than the other parts of the frozen, noodle product, and also due to that the absolute amount of water content in the noodle have became partially short while heating by microwave oven, with the consequence that the re-cooked noodle product can adversely become non-uniform in its texture upon restoration to the original cooked conditions by being heated. To solve this problem, there is proposed a method in which a noodle product is boiled in water to an excessive extent in the step of effecting the gelatinization of the starch component of the noodle, so that an excess of water is positively presented in the inner parts of the noodle, and thereafter the so excessively boiled noodle product is frozen in a known manner. According to this proposed method, however, the adversely affecting non-uniform restoration of the re-cooked noodle product takes place to a lesser extent but the quality of the noodles in the resultant noodle product after the restoration can become far different from the quality that the non-frozen, cooked noodle product essentially shows. Therefore, said proposed method is not able to provide a fundamental solution for the aforesaid problem.

In an attempt to dissolve the problem, we, the present inventor, have made extensively our researches, and as a result, we have accomplished this invention.

Thus, we have paid out attention on that when a cooked noodle product after boiling is to be frozen, the noodle product is usually handled in the form of clumps or masses in which each clump or mass the noodle strings or pieces are loosely entangled and associated together, and hence usually the cooked noodle product in the clump form is placed in a freezing chamber in which the noodles are frozen. We have now found that when the outer, exposing surfaces of the cooked noodles (i.e. the cooked noodle strings or pieces) in each clump of the noodle product are so quickly frozen that there is no time for water to be evaporated off therefrom, and when the exposing surfaces of the frozen noodles are covered with water layers as applied thereonto by spraying water or in any other appropriate way, followed by freezing quickly the outer water layers as formed partly or wholly on the noodle surfaces to produce the outer layers of ice covering the noodle surfaces, this outer ice layers are able to ensure that water is prevented from being evaporated from the exposing surfaces of the noodles in the clump form and hence from the bodies of the noodles, and that the exposing surfaces of the noodles and also the bodies of the noodles within the noodle clump can be prevented from being too much dehydrated owing to the evaporation of water therefrom during storage of the frozen noodle product in a freezer and also during the re-cooking treatment by microwave oven, and thus the non-uniform restoration of the noodle texture is prevented from occurring at a later time when the frozen noodle product is re-cooked and restored to the "ready-to-eat" state, for instance, by being heated in a microwave oven.

In consequence, according to this invention, there is provided a method of preparing a cooked and frozen noodle product capable of being re-cooked to the "ready-to-eat" state uniformly in its texture, with recovering the original, good chewiness of the non-frozen, cooked noodle product, which method comprises applying water onto the outer, exposing surfaces of the noodles in a clump form which have been cooked for effecting the gelatinization of the starch component of the noodle and then have been frozen in the clump form of the noodles, and then immediately and quickly freezing the applied water completely on the noodle surfaces so that ice covers the outer surfaces of the noodles in the clump form.

In accordance with this invention, the term "noodle product" means pastas such as spaghetti, macaroni and vermicelli, namely alimentary pastes, as well as Japanese style noodles, including "Udon" (Japanese style noodle made of wheat flour) and "Soba" (Japanese style noodle made of buck-wheat flour together with or without wheat flour), and Chinese style noodles.

In this invention, the noodle products as used may be any noodle product which has been made into a known noodle shape in a manner known per se and then cooked for effecting the gelatinization of the starch component of the noodle. The gelatinization of the noodle starch component may be achieved in a conventional way for cooking, such as boiling in water, steaming and other suitable cooking methods. The noodle product which has been boiled, steamed or otherwise cooked for the gelatinization of the starch component may, if desired, subsequently be blended with a seasoning mix which is suitable for giving a desired taste to the noodle product and normally may comprises common salt and/or spices.

The cooked, noodle product is then initially frozen in a clump form, if required, after it has been washed with water and weighed into proper serving size. For instance, when cooked spaghetti of "Sauté" style is to be prepared, the raw spaghetti may be boiled in water, then washed with water, further blended with a "Sauté"-seasoning mix comprising common salt and suitable spices and subsequently divided into serving size, namely units of a predetermined weight for sale, before it is subjected to the initial freezing step. Thus, generally according to this invention, the cooked noodle product may subsequently be processed in different ways, depending on the purposes for which the ultimate, frozen noodle products are supplied to consumers, before said cooked noodle product is subjected to the initial freezing step. Anyhow, it is preferred that the cooked noodle product just after the treatment for the gelatinization of the starch component should be processed quickly before the initial freezing step is effected, and that the cooked noodle product should be processed in a total time of 20 minutes or less before it is subjected to the initial freezing. If not and when a longer time is lapsed between the cooking step and the initial freezing step of the cooked noodle product, the chewiness of the finally re-cooked and restored noodle product can be degraded unduly. The initial freezing of the cooked noodle product may be achieved either by quick freezing or by slow freezing. Quick freezing is preferred. The cooked noodle product may preferably have been frozen entirely within a time of 5 hours or less after the start of the initial freezing step.

After the initial freezing of the cooked noodle product in clump form has been carried out, water is applied onto the outer, exposing surfaces of the noodles in the frozen noodle product of clump form in accordance with the process of this invention. It is preferred that the amount of water applied onto the exposing surfaces of the noodles should be in a range of 5 to 15 parts by weight per 100 parts of the initially frozen noodles. If the amount of water applied is lower than the amount of 5 parts by weight per 100 parts of the initially frozen noodles, it is not feasible to achieve the aim of this invention, that is to say, to eliminate the problem that the frozen noodle product could be re-cooked and restored non-uniformly in its texture. On the other hand, if the amount of water applied is higher than the amount of 15 parts by weight per 100 parts of the initially frozen noodles, the water as applied cannot be retained in the form of water layers on the outer, exposing surfaces of the noodles and some water is likely to be drained out of the noodle surfaces. The way of applying water onto the outer exposing surfaces of the noodles in clump form includes immersion in water, water spraying, brushing with water and any other suitable means. Water spraying is a preferred procedure for the application of water, as the amount of water applied is well controllable with this procedure. The method of spraying water may preferably be carried out in such a manner that water is sprayed onto all the exposing surfaces of the noodles as evenly possible. For instance, spraying of water onto the whole sides of the clump of the noodles give better results than spraying of water exclusively onto one side of the noodle clump. The temperature of water to be sprayed may preferably be as much lower as possible, because the water as applied is likely to be rapidly absorbed into the frozen noodle surfaces and thereby is undesirably likely to defrost at least partially the frozen noodle surfaces.

In the process of this invention, the frozen noodle product to which water has been applied in the above-mentioned way is then immediately freezed completely to freeze the water applied on the exposing noodle surfaces so that the ice as formed from the applied water will cover the sides of the noodle clump as well as the outer exposing surfaces of noodles which are loosely entangled and associated together in the clump of the noodles. This re-freezing of the whole noodles is to rapidly freeze the water which has been applied onto the exposing surfaces of the noodles in the clump, preferably evenly, so that thin layer of ice is formed over the outer, exposing surfaces of the noodles in clump shape, whereby the evaporation of water is prevented from taking place later out of the outer exposing surfaces of the noodles and hence from the clump of the noodles.

Accordingly, it is evident that the re-freezing of the frozen noodle product to which water has been applied is preferred to be achieved by quick freezing. The re-frozen noodle product as obtained by the process of this invention is normally distributed commercially to consumers while being kept in the frozen state. It is preferable that the re-frozen noodle product as obtained according to this invention is placed in an air-tight package or container so that further evaporation of water from the noodle clump can be prevented completely.

The frozen noodle products which are obtained from the process of this invention do not involve the adverse, non-uniform restoration of the noodle texture but show uniform texture and favorable chewiness after the re-cooking when they have been re-cooked and restored to the "ready-to-eat" state by heating in the microwave oven.

This invention is now illustrated with reference to the following Examples to which this invention is not limited.

EXAMPLE 1

Commercially available dry and raw spaghetti (4 Kg) with 1.8 mm thickness was boiled in water for 8 minutes, washed with tap water and then blended evenly with a proper quantity of a seasoning mix comprising common salt and spices. The spaghetti so boiled and seasoned were weighed into units of 220 g. which were then placed each in mould vessels. Within 15 minutes after the boiling treatment, the vessels containing the boiled spaghetti were charged into a freezer where quick freezing of the spaghetti was effected for 3 hours.

After the freezing step, the clumps of the frozen spaghetti were removed from the mould vessels, and sprayed with water evenly at all the sides of the respective clumps using 22 g of water per one clump. The water-sprayed clumps of the spaghetti were then immediately and quickly frozen completely with formation of an outer ice layer on the whole sides of the clumps.

After the cooked and frozen spaghetti product so prepared was stored for one month in a freezer, this frozen spaghetti product was re-cooked to the state ready-to-eat, by being heated for 2 minutes in a microwave oven (1.4 KW power). The spaghetti so re-cooked was "Sauté"-like one and was uniform in its texture after the restoration by re-cooking but exhibited very good chewiness.

EXAMPLE 2

The procedures of Example 1 as above were repeated except that the amount of water as sprayed was changed into zero, 5, 11, 33 and 44 g per one clump of the frozen spaghetti. In this way, various "Sauté"-like cooked preparations of spaghetti were obtained, and then were estimated for their mixture. The results of the estimation tests are tabulated below.

TABLE 1

| Amount of water sprayed (g) | Rate (%) of addition of water (in term of weight of boiled and frozen spaghetti) | Estimations |
| --- | --- | --- |
| 0 | 0 | Restored spaghetti being non-uniform in texture and giving poor chewiness |
| 5 | 2 | Restored spaghetti being non-uniform in texture and giving poor chewiness |
| 11 | 5 | Restored spaghetti being uniform in texture and giving good chewiness |
| 22 | 10 | Restored spaghetti being uniform in texture and giving very much good chewiness |
| 33 | 15 | Restored spaghetti being uniform in texture and giving good chewiness |
| 44 | 20 | Frozen spaghetti clumps showing unfavorable appearance due to existence of ice masses at the bottom of the clump. Upon the re-cooking, water pooled at the clump bottom, so that the seasoning mix as coated on the spaghetti surfaces could flow out and different parts of the restored spaghetti showed different tastes. |

The above tests of estimating "chewiness" were conducted according to a panel test using 10 personnels (5 adult male, and same female).

EXAMPLE 3

Commercially available dry and raw macaroni with 4 mm thickness was boiled in water for 10 minutes (to a yield of 240%) (this means that the boiled macaroni weighed 2.4 times as much as the original weight of the dry macaroni), then cooled by washing with water, and subsequently blended evenly with a proper amount of a seasoning mix comprising butter, common salt and spices. The macaroni so boiled and seasoned was then weighed into 200 g-units which were placed each in mould vessels. Within a time of not more than 20 minutes after the boiling treatment, the vessels containing the boiled macaroni noodles were charged into a freezer where quick freezing of the macaroni was effected for 40 minutes. After this freezing, the frozen macaroni was removed out from vessel and then sprayed with water at one side of the macaroni clump using 10 g cf water per one clump. The noodle clumps so water-sprayed were then immediately and quickly re-frozen and packed each in packages.

After the cooked and frozen macaroni product so prepared was stored within the package for one month in a freezer, this product in the package was cooked to the state ready-to-eat, by being heated for 2 minutes in a microwave oven (1.4 KW power). The "Sauté"-like cooked preparations of macaroni were thus obtained, which was uniform in the texture but gave very much favorable chewiness.

EXAMPLE 4

A Japanese style raw noodle, "Soba" with 1.5 mm wideness by 1.4 mm thickness was boiled in water to a yield of 230%, immediately cooled by washing with water and then weighed into 230 g-units, which were placed each in mould vessels. Within a time of not more than 5 minutes after the boiling treatment, the vessels containing the boiled "Soba" were charged into an atmosphere at −40° C. where quick freezing of the boiled "Soba" was effected. After the freezing, the frozen noodle clumps were removed out and sprayed with water evenly at all the sides of the clump using 15 g of water per one clump. The water-sprayed clumps of the "Soba" were then immediately and quickly frozen completely and then packed each in packages.

After the cooked and frozen "Soba" product so prepared was stored within the package in a freezer for one month, this product was cooked to the state ready-to-eat, by being heated for 2 minutes in a microwave oven (1.4 KW power). The so cooked "Soba" were removed from the package, washed with cold tap water and supplied to men as "Zaru-Soba" which is one conventional fashion for Japanese to eat "Soba", when the "Soba" preparations so cooked was uniform in the texture but gave very much good chewiness.

EXAMPLE 5

A Japanese style raw noodle "Udon" with 3 mm wideness by 2.5 mm thickness was boiled in water to a 260% yield, then immediately cooled by washing with water and subsequently blended evenly with a proper amount of a seasoning mix comprising butter, common salt and spices. The "Udon" so boiled and seasoned was then weighed into 250 g-units which were placed each in mould vessels. Within a time of no more than 10 minutes after the boiling treatment, the vessels containing the boiled "Udon" were charged into a freezer at −50° C. where quick freezing of the "Udon" was effected for 40 minutes. After the freezing, the frozen "Udon" clumps were removed out and sprayed with water evenly at all the sides of the "Udon" clump using 38 g of water per one clump. The water-sprayed "Udon" clumps were then immediately and quickly re-frozen and packed each in packages.

After the cooked and frozen "Udon" product so prepared was stored within the package in a freezer for one month, said product was cooked to the state ready-to-eat, by being heated for 3 minutes in a microwave oven. A "Sauté"-like cooked preparation of "Udon" was thus obtained, and this was mixed with some amount of cooked and seasoned vegetables. The resultant food was supplied to men for eating, when it was found that the re-cooked "Udon" was not being non-uniform in the texture but gave good chewiness.

EXAMPLE 6

A Japanese style raw noodle "Udon" made of wheat flour in a conventional Japanese way with 3.75 mm wideness by 2.7 mm thickness was boiled in water, then immediately cooled by washing with water and subsequently weighed into 250 g-units which were placed each in mould vessels. Within a time of no more than 10 minutes after the boiling treatment, the vessels containing the boiled "Udon" were charged into a freezer at −50° C. where quick freezing of the boiled "Udon" was effected. After the freezing, the clumps of the frozen "Udon" were removed out and placed in a cage which was then immersed in a water bath (the temperature of water was at 10° C.) for a time of 1 to 2 seconds. The cage containing the frozen "Udon" clumps was removed out of the water bath and then well drained, when water had been applied to the outer, exposing surfaces of the noodles in a proportion of on average 30 g. of water per one clump of the "Udon". The clumps of the "Udon" with the applied water were then immediately and quickly frozen completely and packed each in packages.

After the cooked and frozen "Udon" product so prepared was stored within the package in a freezer for one month, said product was cooked to the state ready-to-eat, by being heated for 3 minutes in a microwave oven (1.4 KW power). The so cooked "Udon" was then washed with water and then supplied to men for eating, together with Japanese sauce for "Udon" and usual additive ingredients, as "Zaru Udon" which is one usual Japanese fashion for eating boiled "Udon". The "Udon" so cooked was not being non-uniform in the texture but gave good chewiness.

What I claim is:

1. A method of preparing a cooked and frozen noodle product, which method comprises applying water onto the outer, exposing surfaces of the noodles in a clump form which have been cooked for effecting the gelatinization of the starch component of the noodle and then have been frozen, the amount of water applied being in the range of 5 to 15 parts by weight per 100 parts of said noodles in clump form which have been cooked and frozen, and then immediately and quickly freezing the applied water completely on the noodle surfaces so that ice covers the outer surfaces of the noodles in the clump form.

2. The method as claimed in claim 1 in which the application of water is conducted by spraying water onto one side or all the sides of the noodle clump.

3. The method as claimed in claim 1 in which the noodles to which water is to be applied are such noodles which have been cooked, then coated with a seasoning mix and subsequently frozen in the clump form.

4. The method as claimed in claim 1 in which the noodle product is selected from the group consisting of Japanese style noodles, Chinese style noodles, macaroni, spaghetti and vermicellie.

* * * * *